United States Patent Office 3,118,308
Patented Jan. 21, 1964

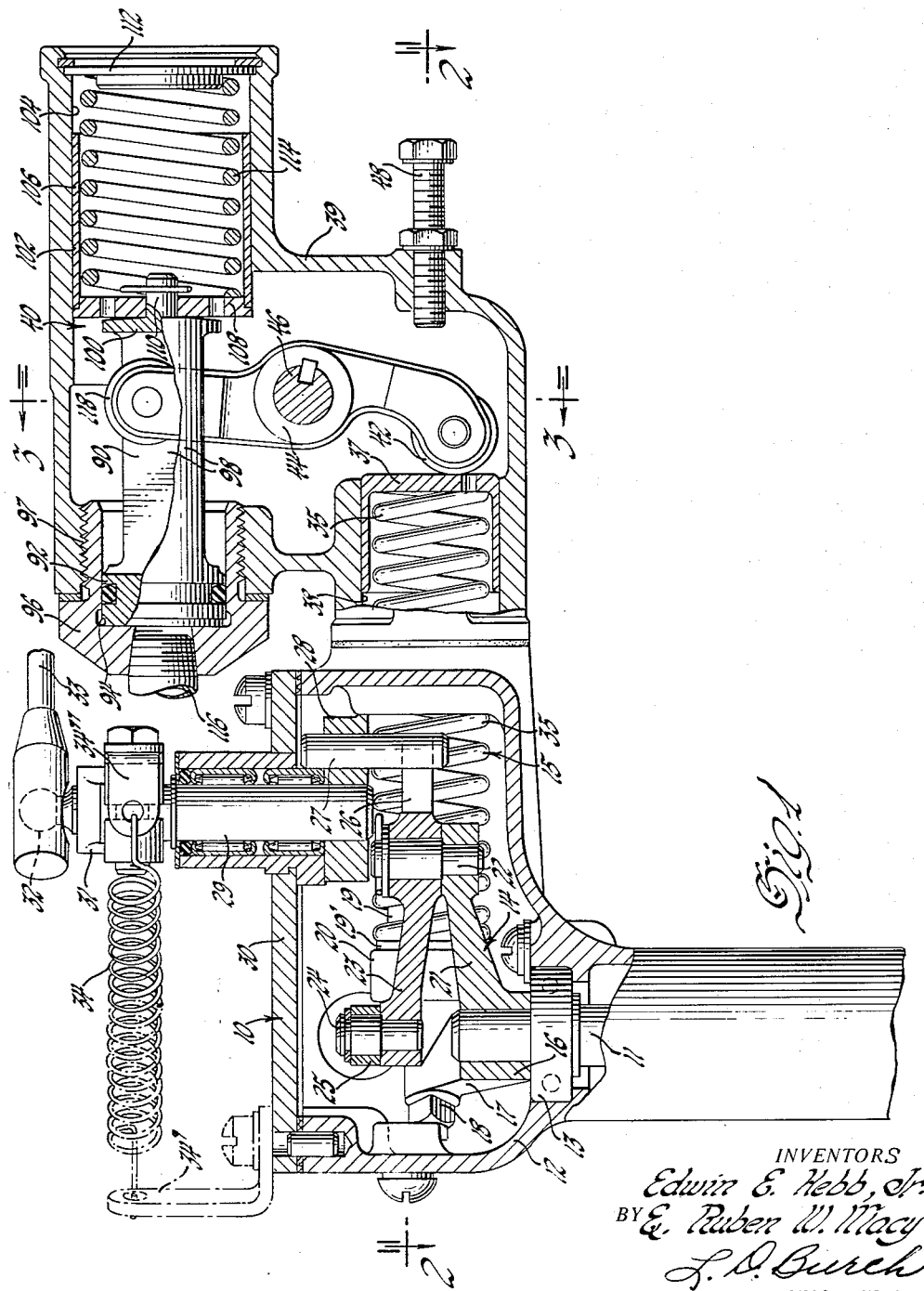

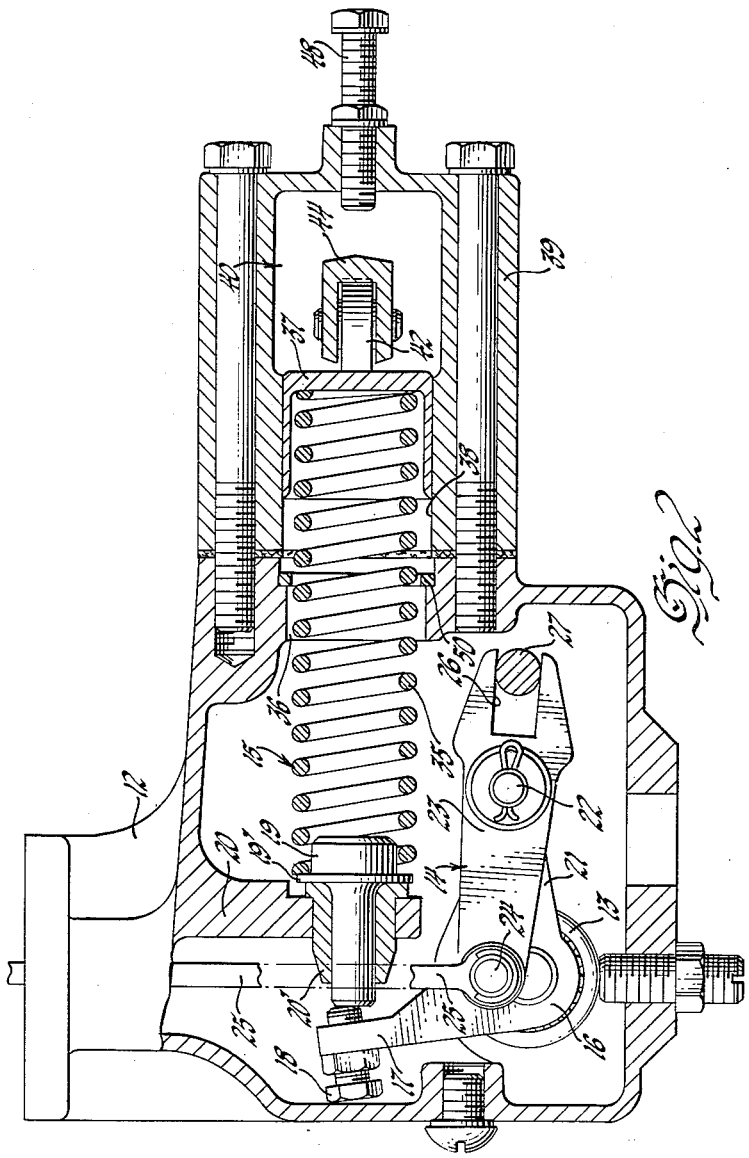

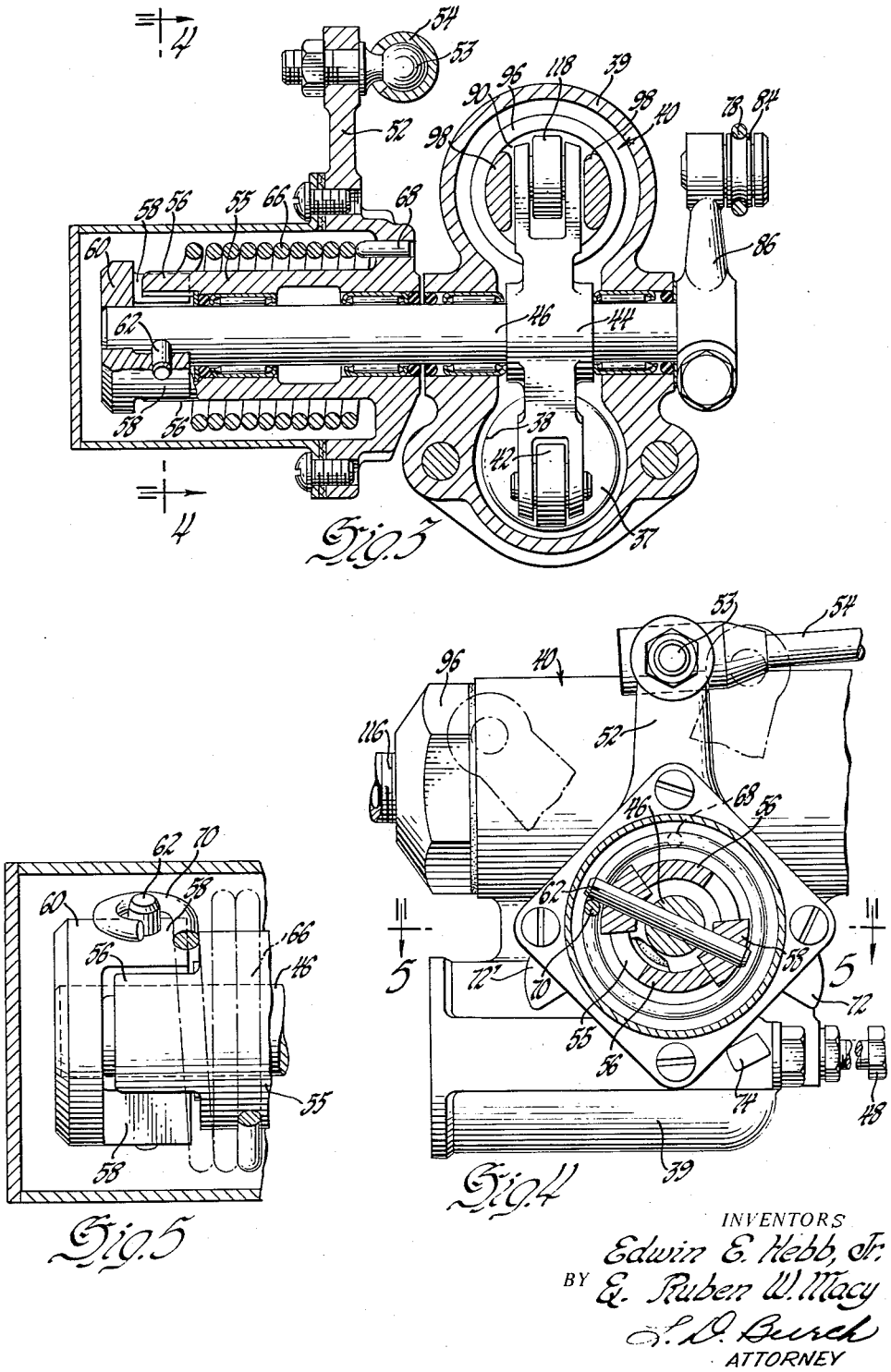

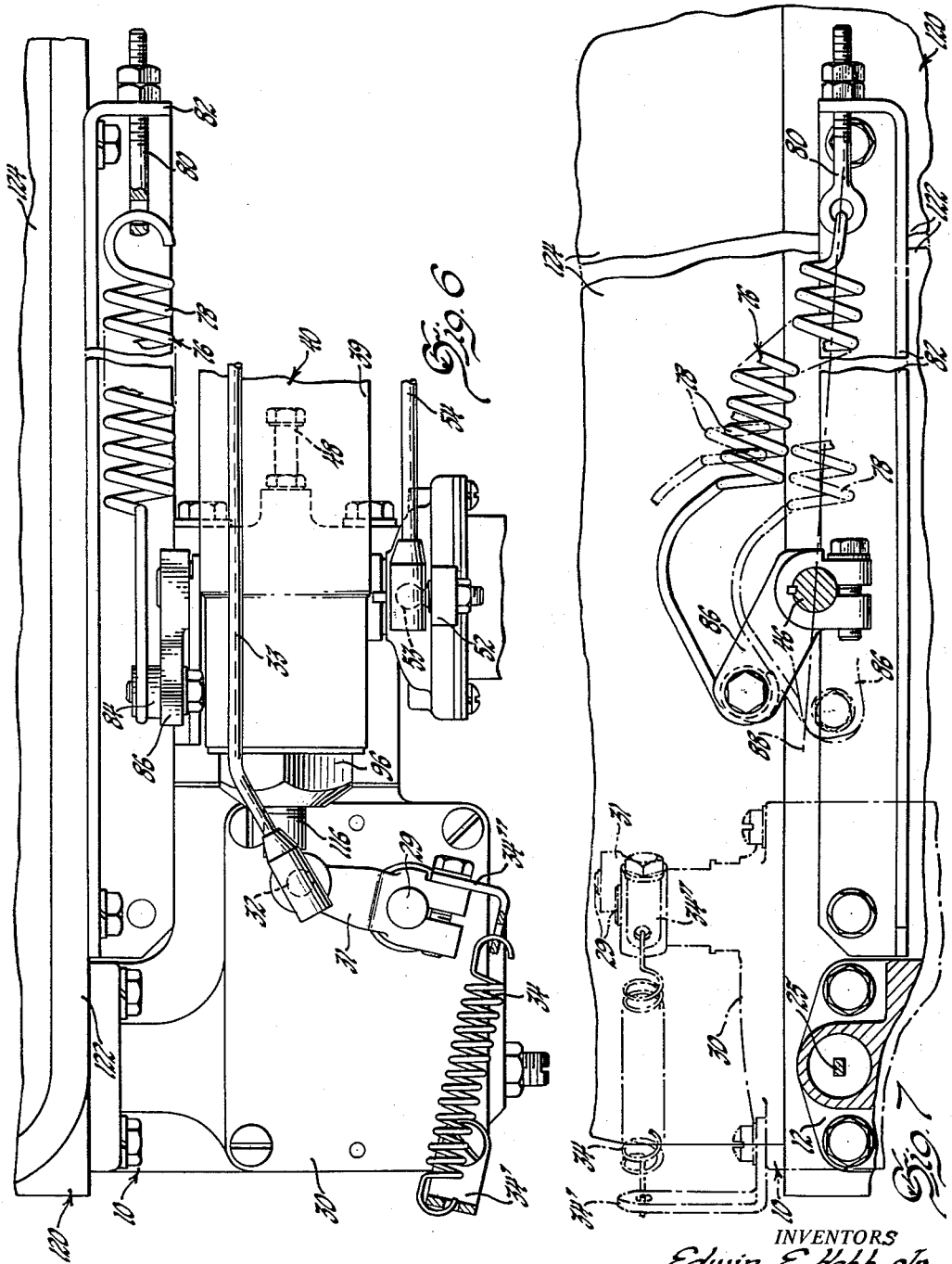

3,118,308
VARIABLE SPEED GOVERNOR WITH THROTTLE OVERRULE MECHANISM
Edwin E. Hebb, Jr., Dearborn, and Ruben W. Macy, Detroit, Mich., assignors to General Motors Corporation, Detroit, Mich., a corporation of Delaware
Filed Nov. 16, 1959, Ser. No. 853,299
8 Claims. (Cl. 73—513)

This invention relates generally to a governor for an internal combustion engine power plant of the type normally used on heavy duty motor vehicles such as buses, trucks, off-the-road construction equipment, etc., and more particularly to a servo mechanism operable to overrule the manual speed setting control of a variable speed governor for such a power plant in response to a change in a vehicle, transmission or engine operative control condition.

In heavy duty motor vehicle applications, it is generally necessary to provide a variable speed governor which is normally operable to control the speed of the engine and thereby the speed of the vehicle in accordance with the movement of a manual speed setting control, such as a foot-operated pedal. Under certain vehicle operating conditions, such as during periods of compressive engine or dynamic transmission braking of the vehicle and during shifts between transmission ratios including direction reversals in certain installations, it is extremely desirable to either interrupt or substantially reduce the engine output torque and speed during such periods of operation for efficient operation and maximum component life. Under high speed gear drive through the transmission, a reduced governor controlled maximum engine speed may also be desirable to control the maximum road speed of the vehicle while permitting use of a higher maximum engine speed for greater vehicle load acceleration in the lower and intermediate speed gear drive ratios. Manual interruption or reduction of engine output torque and speed by operator actuation of the manual throttle control necessarily requires stepped manipulation of the several controls necessary to effect the desired operation. Such stepped control operation is time consuming and otherwise detrimental to vehicle operating efficiency. Such stepped control operation is also fatiguing and tends to reduce efficient operator control of the vehicle. Where the operator is inexperienced or careless, failure to reduce the engine output torque and speed prior to and during desired operating changes often results in excessive, expensive wear and breakage of the several vehicle components.

The invention contemplates a servo control mechanism which is immediately and automatically operable to overrule the manual speed setting control of a variable speed governor to reduce engine power in response to a change in one or more vehicle or engine control conditions and to immediately and automatically return the governor to its original operator selected speed control condition upon cutoff of such vehicle or engine control conditions.

The foregoing and other objects, advantages and features of the invention will become apparent and more thoroughly understood from the following description of a preferred embodiment thereof in which reference is made to the attached drawings, in which:

FIGURE 1 is an elevational view with portions thereof broken away and in section and showing a variable speed engine governor incorporating a throttle overrule servo control mechanism constructed in accordance with the invention;

FIGURE 2 is a broken sectional view of the governor taken substantially in the plane of the line 2—2 of FIGURE 1;

FIGURE 3 is a sectional view of a governor speed setting control of the invention taken substantially in the plane of the line 3—3 of FIGURE 1;

FIGURE 4 is a side elevational view of a portion of the governor speed setting control broken away and in section substantially in the plane of the line 4—4 of FIGURE 3;

FIGURE 5 is an enlarged fragmentary view of a portion of FIGURE 3 and showing certain elements thereof in elevation;

FIGURE 6 is a top elevational view showing a preferred installation of the governor of the invention on an internal combustion engine; and FIGURE 7 is a side elevational view of the governor installation of FIGURE 6 with portions thereof broken away and in section to show certain details thereof.

Referring more particularly to the drawings, FIGURE 1 shows a variable speed engine governor mechanism 10 including a power shaft 11 suitably journaled within a casing 12 by bearings 13. The power shaft 11 is adapted to be rotatably actuated by a centrifugal flyweight mechanism, not shown, in accordance with variations in engine speed. Such speed responsive rotation of the shaft 11 is opposed by a speeder spring assembly 15 acting through a fuel control linkage 14. The fuel control linkage 14 includes a bell crank lever 16 secured to rotate with the upper end of the shaft 11. One arm 17 of the bell crank lever carries an adjusting screw 18 which thrustably engages one end of a plunger or spring seating element 19 of the speeder spring assembly 15. The spring seating plunger 19 is reciprocably mounted in a sleeve bearing 20' carried by a flange 20 formed integrally of the casing. A second arm 21 of the lever 16 carries a pin 22 which pivotally mounts a floating differential lever 23 intermediate its ends. One end of the floating lever is pivotally connected by a pin 24 to a link 25 which is connectable to an engine fuel control mechanism, such as a fuel injector control rack. The other end of the floating lever has a slot 26 pivotally engaging a pin 27 which is adjustable between an engine "off" and an engine "running" position. The pin 27 is carried by a lever 28 secured to the lower end of a control shaft 29 journaled in a detachable cover 30 for the casing 12. Another lever 31 suitably secured to the upper end of the control shaft 29 is pivotally connected at 32 to an operator controlled linkage 33. A spring 34 is tensively interposed between brackets 34' and 34'' secured to the cover 30 and the lever 31 and normally biases the lever 31 and thereby the pin 27 to its "running" position. When in its "running" position, the pin 27 serves as a pivot for fuel controlling movement imparted to the lever 23 by movement of the power or output lever 16 in effecting equilibrium between the fuel increasing biasing action of the speeder spring assembly and the fuel decreasing biasing action of the speed responsive flyweight mechanism. Operator effected movement of the pin 27 to its "off" position serves to carry the floating lever 23 and thereby the fuel control link 25 to a fuel "off" position wherein the engine fuel control mechanism is conditioned to shut off the supply of fuel to the engine.

An annular flange 19' limits fuel increasing movement of the plunger 19 by abutment against the bearing 20'. The flange 19' further serves as a spring seat for one end of a helical speeder spring 35. The opposite end of the speeder spring 35 extends through an opening 36 in the casing 12 and is seated against the bottom of a cup-shaped piston 37. The piston 37 serves as an adjustable reaction member for the speeder spring being reciprocably mounted for such adjustment within a bore 38 which is formed within a second casing member 39 and assembled in alignment with the opening 38 and the plunger 19. A throttle overrule and speed setting mechanism 40 constructed in accordance with the invention is partially housed within the casing 39 and is operable to effect speeder spring adjusting movement of the piston 37. As indicated above, the control mechanism 40 is operable under certain power plant or vehicle control conditions to permit direct operator control of the governor speed setting in accordance with the manual actuation of a throttle control linkage and is operable under certain other control conditions to reduce the engine speed and power maintaining fuel supply of the fuel control mechanism by overriding the throttle control to establish a lower governor maintained speed setting in response to one or more of such other control conditions.

As best seen in FIGURES 1 and 3, the speed setting mechanism includes a roller 42 rotatably carried by one arm of a speeder spring adjusting lever 44. The lever 44 is secured intermediate its ends to a speed control shaft 46, the shaft 46 extending through and projecting from the housing 39 and being suitably journaled therein for rotation about an axis spaced from and extending transversely of the axis of the speeder spring assembly 15. The roller 42 thrustably engages the piston 37 in a bias increasing direction against the reaction of the speeder spring 35 and is operable through suitable actuation of the lever 44 to shaft the piston 37 between minimum and maximum engine speed positions. Such speed limit positions are defined, respectively, by a stop screw 48 threadably adjustable with respect to the housing 39 and a shoulder defining stop washer 50 mounted in a counterbore of the opening 36. The axial thickness of the stop washer 50 may be varied to provide various desired maximum speed limits in different types of engine installations.

A manual speed setting control lever 52 is pivotally connected at 53 to an operator controlled throttle linkage indicated at 54. The opposite end of the lever 52 defines a cylindrical sleeve or hub portion 55 which is suitably journaled on that portion of the shaft 46 projecting outwardly of the housing 39 on the engine outboard side of the governor. The outer end of the hub portion 55 defines two axially extending and diametrically opposed lugs 56. These lugs cooperate to define a lost motion driving connection with two similarly disposed mating lugs 58 which extend axially from a flanged dog member 60 embracing and drivingly secured to the outer end of the shaft 46 by a pin 62 extending diametrically therethrough. A helical spring 66 concentrically embraces the hub 55 and is torsionally interposed between the lever 52 and the shaft-secured dog member 60, the ends thereof being connected at 68 to the lever and at 70 to the projecting end of the pin 62. The torsion spring is prestressed in assembly to exert a biasing action tending to bias the shaft and dog member in a speeder spring bias increasing direction as limited by engagement between the lugs 56 and 58 and hence the operative position of the lever 52. The prestressing of the torsion spring is preferably in excess of the biasing reaction of the speeder spring 35 when the spring setting piston is in abutment with the high speed stop 50. Actuation of the lever 52 in a speed increasing direction is thus transmitted through the spring 66 and rotates the shaft 46 and the lever 44 in a clockwise direction, as viewed in FIGURES 1 and 4, between its engine minimum and maximum speed positions thereby increasing the speeder spring bias. Upon abutment of the piston 37 with its high speed stop, deflection of the torsion spring 66 permits over-travel of the lever 52 in a further speed increasing direction. Such overtravel is limited by engagement between a lever-carried dog 72 and an abutment boss 74 formed externally of the housing 39. It will be noted that the lever 52 is provided with an alternate dog 72' thus permitting the lever 52 to be mounted on either side of the control housing 39, the control housing 39 being symmetrical about a vertical median plane passing therethrough to permit alternative mounting on various engine installations. Speed decreasing actuation of the lever 52 is transmitted directly through the driving engagement between the lugs 56 and 58 to rotate the shaft 46 and the lever 44 in a counterclockwise direction between its maximum and minimum speed positions.

From the description of the governor and speed setting control so far described, it will be noted that actuation of the speed setting lever 52 is directly opposed by the biasing reaction of the speeder spring 35. To compensate for or negate this biasing reaction of the speeder spring, a booster spring system is preferably provided to augment the manual actuating force applied to the speed control shaft 46 and lever 44. Such a booster spring system is indicated generally at 76 in the illustrative engine installation of FIGURES 6 and 7 wherein the governor 10 is so mounted on the side of the engine 120 as to place the fuel control linkage adjacent the cylinder head 122, the fuel control mechanism being housed between the cylinder head and the head cover 124.

The spring system 76 comprises a helical booster spring 78 acting in tension between a first pivotal connection provided by an eyebolt 80 threadably carried by an engine mounted bracket 82 and a second pivotal connection provided by a spool member 84 rotatably carried by one end of a lever arm 86. The opposite end of the lever 86 is suitably secured to the end of the shaft 46 projecting from the housing 39 on the side opposite the speed setting lever 52. As shown in broken lines in FIGURE 7, the lever 86 is so oriented relative to the shaft 46 as to place the pivot axis of the spool 84 slightly below an overcenter or spring neutral line 88 passing through the eyebolt pivot and the axis of the shaft 46 when the lever 44 is in its engine idle or minimum speed position in abutment with the stop screw 48. The booster spring 78 thus tends to detent the speed setting linkage in this idle speed position. Upon rotation of the shaft 46 in an increasing speed direction carrying the spool axis above the overcenter line 88, the effective moment arm of the spring 78 is progressively increased as the lever 86 approaches its maximum engine speed position, also shown in broken lines. This increase in the effective moment arm is accompanied by some foreshortening of the spring 78 with a corresponding reduction in the tensive force applied thereby. With proper prestressing of the booster spring 78 by adjustment of the eyebolt 80, the geometry of the booster spring system is such that the moment applied to the lever 86 for any given position thereof will be substantially equal and opposite to the moment applied to the shaft 46 by the speeder spring acting through the lever 44. By this means the speed control setting of the governor can be adjusted and maintained by the operator with only a limited and negligible actuating effort.

The throttle overrule mechanism includes a piston member 90 having a head end portion 92 reciprocably mounted in and defining an expansible chamber 94 with a thimble-shaped cylinder defining member 96 which is threadably mounted in a tapped opening 97 provided in the housing 39. The opposite end of the piston member is connected to the head end thereof by two longitudinally extending, spaced parallel struts 98 and defines an adjustable high speed stop 100. The stop end of the piston is reciprocably guided for axial movement of the piston by a cup-shaped spring retainer 102 slidably mounted within a bore 104 provided in the housing 39, the bore 104 being in spaced coaxial relation to the bore of the cylinder member 96. The spring retainer 102 comprises a cylindrical sleeve 106 guiding the retainer assembly within the bore 104 and a spring seating plate 108 closing one end of the sleeve and centrally embracing and supporting an axially extending projection 110 carried by the stop end of the piston 90. A second spring seating plate 112 is mounted adjacent the end of the bore 104 opposite the plate 108 and a helical spring 114 is compressively interposed therebetween to urge the piston 90 toward abutment with the chamber defining end of the cylinder member 96. When the piston is in such abutment, the high speed stop end 100 thereof is engageable by a roller 118 carried by an upwardly extending second arm of the speed setting control lever 44. Such engagement between the roller 118 and the speed stop 100 is effected by speed increasing movement of the lever 44 and occurs at a speed setting substantially prior to abutment of the speeder spring seating piston 37 with the maximum engine speed stop 50. As the compressive loading of the spring 114 is in excess of the torsional loading of the spring 66, this position of the stop 100 limits or prevents further movement of the lever 44 in a speed increasing direction between the speeder spring seating piston 37 and the maximum engine speed stop 50, further speed increasing movement of the manual speed setting lever 52 beyond a corresponding position being accommodated by deflection of the torsion spring 66 and the lost motion connection provided by the lugs 56 and 58.

Under operating conditions wherein full operator control is desirable between the minimum and maximum engine speed limits, fluid pressure is supplied from a suitable source, not shown, to the expansible chamber 94 through a conduit partially indicated at 116 by the selective operation of suitable valve means, also not shown. Such a valve means should be at least a three-way unit operable in one position thereof to vent the chamber 94 and may be responsive to or actuated by a change in a particular engine, transmission or vehicle control condition, such as vehicle or compressive engine braking, clutching and declutching, transmission gear shifting, or by a combination of such conditions. The fluid pressure thus supplied actuates the piston 90 to the right against the biasing action of the spring 114 until the sleeve 106 abuts the stationary spring seating plate 112. When the sleeve is in such abutment, the high speed stop end of the piston member is incapable of limiting the speed increasing movement of the lever 44 being carried beyond possible engagement by the roller 118 prior to maximum engine speed limiting abutment between the piston 37 and the stop 50.

Upon venting the expansible chamber 94 by operation of the pressure supply valve means in response to a change in the controlling engine, transmission or vehicle operating condition or conditions, the spring 114 carries the piston into abutment with the expansible chamber end of the cylinder member 90 thus limiting speed increasing movement of the lever 44 as explained above. Where such venting of the expansible chamber 94 is effected while the lever 44 is beyond its adjustable stop limited position, such spring effected movement of the piston 90 carries the lever 44 to its lower high speed maintaining position with a consequential reduction in the speeder spring bias. Since the engine is still operating at or near the higher speed corresponding to the position of the throttle actuating lever 52, this reduced biasing action of the speeder spring 35 permits the centrifugal speed responsive mechanism to actuate the fuel control linkage to a control position wherein the fuel control mechanism is regulated to supply little or no fuel until the engine has been decelerated to a speed corresponding to the stop limited position of the lever 44. Consequently, engine output torque is temporarily reduced to a negligible value during the transitory period wherein the desired change is effected in the particular control conditions.

In applications wherein the throttle overrule is responsive to shifts between various transmission drive ratios including load reversals, the momentary reduction in engine output torque effected during such shift periods substantially increases the life of the transmission clutch and gear members, such members being subjected only to inertial loads during such shifting periods. In braking applications, the temporary fuel cutoff effected by such throttle overrule operation contributes substantially to engine and braking efficiency and substantially increases the service life of coacting brake members. In these and other applications wherein throttle overrule is desired only during the condition changing period, cutoff of the change effecting or controlled fluid pressure signal and the venting thereof from the expansible chamber 94 permits the speed setting of the governor and consequently engine speed to be returned to the original operator selected speed corresponding to the maintained position of the lever 52. Such speed adjustment is accomplished immediately, automatically and with a minimum of hunting since substantial spring bias is maintained on the fuel control linkage during the transition period. As indicated above, the throttle overrule mechanism of the invention may also be used to provide continuous reduced maximum engine speed in response to the establishment of high speed gear drive through the transmission in a vehicular application to thereby limit the maximum road speed of the vehicle.

By appropriate axial dimensioning of the sleeve 106 and the piston head 92, selective fluid pressure actuation of the throttle overrule piston abutting the sleeve 106 against the spring seat plate 112 may also be used to provide an alternative engine idle speed limit slightly higher than that permitted by the stop screw 48 since engagement of the roller 118 with the piston head 92 prevents any further actuation of the levers 44 and 52 in a speed decreasing direction. Such operation is often desirable to prevent engine speed droopage below the normal stable idling speed of the engine in applications wherein the idling engine is selectively and alternatively called upon to drive substantial accessory load mechanisms. An air conditioned bus is an example of such an application, the idling engine being required to drive the substantial load of the air conditioning compressor prior to and during passenger loading and unloading periods and during other prolonged periods when the bus is not in motion.

From the foregoing description of the illustrative embodiment, it will be apparent to those skilled in the art that various changes might be made therein without departing from the spirit and scope of the invention as defined in the following claims.

What is claimed is:

1. A governor for an internal combustion engine having means operable to control the fuel supplied to the engine, said governor including a first member shiftable between two extreme fuel supply controlling positions, means responsive to the speed of the engine and operable to urge said fuel control member in a fuel supply decreasing direction in response to increased engine speed, a first resilient means biasing said fuel supply controlling member in a fuel increasing direction in opposition to said speed responsive means, a second member movable to adjust said resilient means to vary the biasing effect thereof between minimum and maximum engine speed controlling limits, means for moving said second member between said speed controlling limits and including a third member movable in accordance with desired engine speed and operable upon movement in one direction to drivingly engage and shift said second member toward one of said engine speed limits, a second resilient means interposed between said second and third members and operable to bias said second member toward and normally maintaining such driving engagement between said second and third members, said second resilient means carrying said second member toward the other of said speed limits upon movement of said third member opposite said one direction, and adjustable stop means operable in response to a control signal supplied thereto to prevent movement of said second member toward said other speed controlling limit beyond an intermediate speed controlling position, said second resilient means accommodating movement of said third member in said opposite direction beyond the stop limited position of said second member when said stop means is energized.

2. A governor for an internal combustion engine having means operable to control the fuel supplied to the engine, said governor including a first member shiftable between "no fuel" and "full fuel" supply controlling positions, said member being connectable to the engine fuel supply control means and operable thereon to control the supply of fuel to the engine, means responsive to the speed of the engine and operable to urge said fuel control member in a fuel supply decreasing direction toward its "no fuel" position upon increased engine speed response of said responsive means, a first resilient means biasing said fuel supply controlling member in a fuel increasing direction toward its "full fuel" position in opposition to said speed responsive means, a second member movable to adjust said resilient means to vary the biasing effect thereof between minimum and maximum engine speed controlling limits, means for moving said second member between said speed controlling limits and including a third member movable in accordance with desired engine speed and operable upon movement in one direction to drivingly engage and shift said second member toward said minimum engine speed controlling limit, a second resilient means interposed between said second and third members and operable to bias said second member toward and normally maintaining such driving engagement between said second and third members, said second resilient means carrying said second member toward said maximum engine speed controlling limit upon movement of said third member opposite said one direction, and adjustable stop means operable in response to a control signal supplied thereto to prevent movement of said second member toward said maximum speed controlling limit beyond an intermediate speed controlling position, said second resilient means accommodating movement of said third member in said opposite direction beyond the stop limited position of said second member when said stop means is energized.

3. A governor for an internal combustion engine having means operable to control the fuel supplied to the engine, said governor including a first member shiftable between two extreme fuel supply controlling positions, means responsive to the speed of the engine and operable to urge said fuel control member in a fuel supply decreasing direction in response to increased engine speed, a first resilient means biasing said fuel supply controlling member in a fuel increasing direction in opposition to said speed responsive means, a spring seating member movable to adjust said resilient means to vary the biasing effect thereof between minimum and maximum engine speed controlling limits, lever means including a first lever thrustably engageable with and operable to move said spring seating member between said speed controlling limits, a second lever pivotally mounted with respect to said first lever and movable in accordance with desired engine speed, lost motion drive means intermediate said first and second levers and operable upon movement of said second lever in one direction to drivingly engage said first lever to carry said spring seating member toward one of its engine speed controlling limits, a second resilient means torsionally interposed between said first and second levers and biasing said second lever toward and normally maintaining such driving engagement between said first and second levers, said second resilient means normally carrying said first lever and said spring seating member toward the other of said speed controlling limits upon movement of said second lever opposite said one direction, and adjustable stop means operable in response to a control signal supplied thereto to prevent movement of said first lever carrying said second member toward said other speed controlling limit beyond an intermediate speed controlling position, said second resilient means accommodating movement of said second lever in said opposite direction beyond the stop limited position of said first lever when said stop means is energized.

4. In a governor as set forth in claim 3, said adjustable stop means including a piston, cylinder means reciprocably mounting and defining an expansible chamber with said piston, said piston having an abutment stop thereon engageable with said first lever, a third resilient means for biasing said piston member to a first position wherein said abutment stop engages said first lever to prevent movement thereof toward said other operative position beyond said intermediate speed controlling position, said second resilient means accommodating movement of said second lever in said opposite direction beyond the stop limited position of said first lever, and means for selectively supplying fluid pressure to said expansible chamber to reciprocate said piston in opposition to said third resilient means to a second position wherein said abutment stop is carried out of possible engagement with said first lever.

5. In combination with an engine speed control mechanism including a driven member movable to regulate fuel supply and thereby the speed of an engine, a first resilient means for biasing said fuel control member in a fuel increasing direction, an engine speed responsive means operatively connected to and urging said fuel control member in a fuel decreasing direction in opposition to said first resilient means, a first lever member movable between two extreme operative positions to adjust the biasing effect of said first resilient means to vary the governed engine speed, manual control means including a second lever member, lost motion drive means intermediate said first and second lever members operable upon actuation of said second lever member in one direction to directly actuate said first lever member toward one of said extreme operative positions and operable upon actuation thereof in the opposite direction to accommodate lost motion therebetween, a second resilient means interposed between said first and second lever members and normally maintaining a direct driving relation therebetween whereby movement of said second lever member opposite said one direction permits movement of said first lever member toward the other of said extreme operative positions, and control means selectively operable to restrain movement of said first lever member toward said other extreme operative position beyond an intermediate speed controlling position, said control means including a piston, cylinder means reciprocably mounting and defining an expansible chamber with said piston, said piston having an abutment stop thereon engageable with said first lever member, a third resilient means for biasing said piston member to a first position wherein said abutment stop engages said first lever member to prevent movement thereof toward said other operative position beyond said intermediate speed controlling position, said second resilient means accommodating movement of said second lever member in said opposite direction beyond the stop limited position of said first lever member, and means for selectively supplying fluid pressure to said expansible chamber to reciprocate said piston in opposition to said third resilient means to a second position wherein said abutment stop is carried out of possible engagement with said first lever member.

6. A governor for an internal combustion engine having means operable to control the fuel supplied to the engine, said governor including a first member shiftable between two extreme fuel supply controlling positions, means responsive to the speed of the engine and operable to urge said fuel control member in a fuel supply decreasing direction in response to increased engine speed, a first resilient means biasing said fuel supply controlling member in a fuel increasing direction in opposition to said speed responsive means, a spring seating member movable to adjust said resilient means to vary the biasing effect thereof between minimum and maximum engine speed controlling limits, lever means including a first lever thrustably engageable with and operable to move said spring seating member between said speed controlling limits, a second lever pivotally mounted with respect to said first lever and movable in accordance with desired engine speed, lost motion drive means intermediate said first and second levers and operable upon movement of said second lever in a speed decreasing direction to drivingly engage said first lever to carry said spring seating member toward its minimum speed controlling limit, a second resilient means torsionally interposed between and biasing said second lever toward and normally maintaining such driving engagement between said first and second levers, said second resilient means normally carrying said first lever and said second member toward the maximum speed controlling limit upon movement of said second lever in the opposite speed increasing direction, and an adjustable stop means selectively operable to prevent movement of said first lever carrying said second member toward said speed controlling limits beyond intermediate speed controlling positions, said adjustable stop means including a piston, cylinder means reciprocably mounting and defining an expansible chamber with said piston, said piston having spaced abutment stops thereon engageable with said first lever, a third resilient means for biasing said piston member to a first position wherein one of said abutment stops is engageable with said first lever to prevent movement thereof toward said maximum speed limit beyond one of said intermediate speed controlling positions, said second resilient means accommodating movement of said second lever in the speed increasing direction beyond the stop limited position of said first lever, and means for selectively supplying fluid pressure to said expansible chamber to reciprocate said piston in opposition to said third resilient means to a second position wherein said one abutment stop is carried out of possible engagement with said first lever, and the other of said abutment stops is engageable with said first lever to prevent movement thereof toward said minimum speed limit beyond the other of said intermediate speed controlling positions.

7. In a speed responsive governor mechanism operable to control the fuel supply and thereby the speed of an internal combustion engine, control means including a first member movable to adjust the speed maintaining action of said governor between minimum and maximum engine speed controlling limits, means for moving said first member between said speed controlling limits and including a second member movable in accordance with desired engine speed and operable upon movement in one direction to engage and shift said first member toward said minimum engine speed controlling limit, resilient means interposed between said first and second members and operable to bias said first member toward and normally maintaining such engagement therebetween, said resilient means carrying said first member toward said maximum engine speed controlling limit upon movement of said second member in the opposite direction, and adjustable stop means operable in response to a control signal supplied thereto to prevent movement of said first member toward said maximum speed controlling limit beyond an intermediate speed controlling position, said resilient means accommodating movement of said second member in said opposite direction beyond the stop limited position of said first member when said stop means is energized.

8. In a governor mechanism operable to regulate the fuel supply and thereby the speed of an internal combustion engine, control means for adjusting the speed maintaining action of said governor mechanism and including a first lever movable to adjust said control means between minimum and maximum engine speed controlling limits, a second lever pivotally mounted with respect to said first lever and movable in accordance with desired engine speed, lost motion drive means intermediate said first and second levers and operable upon movement of said second lever in one direction to drivingly engage and carry said first lever toward one of its engine speed controlling limits, a first resilient means torsionally interposed between said first and second levers and biasing said second lever toward and normally maintaining such driving engagement between said first and second levers, said first resilient means normally carrying said first lever toward the other of said speed controlling limits upon movement of said second lever opposite said one direction, and an adjustable stop means selectively operable to prevent movement of said first lever toward said other speed controlling limit beyond an intermediate speed controlling position, said adjustable stop means including a piston, cylinder means reciprocably mounting and defining an expansible chamber with said piston, said piston having an abutment stop thereon, a second resilient means for biasing said piston member to a first position wherein said abutment stop is engageable with said first lever member to prevent movement thereof toward said other speed controlling limit beyond said intermediate speed controlling position, said first resilient means accommodating movement of said second lever in said opposite direction beyond the stop limited position of said first lever, and means for selectively supplying fluid pressure to said expansible chamber to reciprocate said piston in opposition to said second resilient means to a second position wherein said abutment stop is carried out of possible engagement with said first lever.

References Cited in the file of this patent

UNITED STATES PATENTS

| 1,561,773 | Carpenter | Nov. 17, 1925 |
| 2,333,044 | Rosch | Oct. 26, 1943 |
| 2,456,712 | Kremiller | Dec. 21, 1948 |
| 2,875,635 | Fleck et al. | Mar. 3, 1959 |
| 2,909,078 | Nallinger | Oct. 20, 1959 |

FOREIGN PATENTS

| 489,857 | Great Britain | Aug. 4, 1938 |
| 749,210 | Germany | Nov. 17, 1944 |